(12) United States Patent
Kitajima

(10) Patent No.: US 6,650,829 B2
(45) Date of Patent: Nov. 18, 2003

(54) SIGNAL RECORDING APPARATUS AND METHOD

(75) Inventor: Mariko Kitajima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/357,219

(22) Filed: Jul. 20, 1999

(65) Prior Publication Data

US 2003/0053796 A1 Mar. 20, 2003

(30) Foreign Application Priority Data

Jul. 22, 1998 (JP) .......................................... 10-206945

(51) Int. Cl.$^7$ .............................................. H04N 5/225
(52) U.S. Cl. ........................... 386/120; 386/46; 386/117
(58) Field of Search ................................ 386/1, 45–46, 386/120, 117, 125–126, 95; 360/31, 69; 704/274, 265

(56) References Cited

U.S. PATENT DOCUMENTS

| | | | | |
|---|---|---|---|---|
| 5,353,379 A | * | 10/1994 | Nakajima et al. | ........... 704/274 |
| 5,402,171 A | * | 3/1995 | Tagami et al. | ........... 348/219.1 |
| 5,740,304 A | * | 4/1998 | Katsuyama et al. | ........ 386/125 |
| 5,745,454 A | * | 4/1998 | Yokota | ..................... 369/47.21 |
| 6,222,803 B1 | * | 4/2001 | Uemura et al. | .......... 369/44.29 |
| 6,253,023 B1 | * | 6/2001 | Fukushima et al. | ......... 386/117 |
| 6,347,184 B2 | * | 2/2002 | Yamagishi | .................. 386/95 |

* cited by examiner

Primary Examiner—Thai Tran
Assistant Examiner—Christopher Onuaku
(74) Attorney, Agent, or Firm—Frommer Lawrence & Haug LLP; William S. Frommer

(57) ABSTRACT

A signal recording apparatus is provided which comprises a first recording medium; a second recording medium; and a controlling means for providing a difference between a trigger sound issued when a still picture is recorded into the first recording medium and a one issued when a still picture is recorded into the second recording medium.

7 Claims, 2 Drawing Sheets

SIGNAL RECORDING APPARATUS AND METHOD

BACKGROUND OF THE INVENTION

1. Field of the Invention

The present invention relates to a signal recording apparatus adapted to record a still picture in a first recording medium such as a video tape and in a second recording medium such as a semiconductor memory.

2. Description of Related Art

Many of the conventional signal recorders use only a single alarm or warning sound to inform the user of the operation and status of them. The single sound has only one tone in many cases.

As in the above, the apparatus is designed to provide an alarm or warning sound upon operation thereof However, if the apparatus provides different results from one operation, sound is used to inform the user of the operation. In this case, if only a single sound is available or if the sound has only a single tone, the user will not be able to know which one of the possible different results has been led from the operation of the apparatus.

SUMMARY OF THE INVENTION

It is therefore an object of the present invention to overcome the above-mentioned drawbacks of the prior art by providing a signal recording apparatus and method adapted to produce different sounds which allow the user to correctly tell apparatus functions different from but similar to each other.

The above object can be attained by providing a signal recording apparatus comprising a first recording medium and second recording medium, to both of which a signal can be recorded, and a controlling means for providing a difference between a trigger sound issued when a still picture is recorded into the first recording medium and a one issued when a still picture is recorded into the second recording medium.

The signal recording apparatus is also adapted to record a moving picture in addition to a still picture into at least the first recording medium.

The controlling means generates a different trigger sound from a different source. Further, the trigger sound source for recording a still picture into the second recording medium is put in a sleep mode when it is unused.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
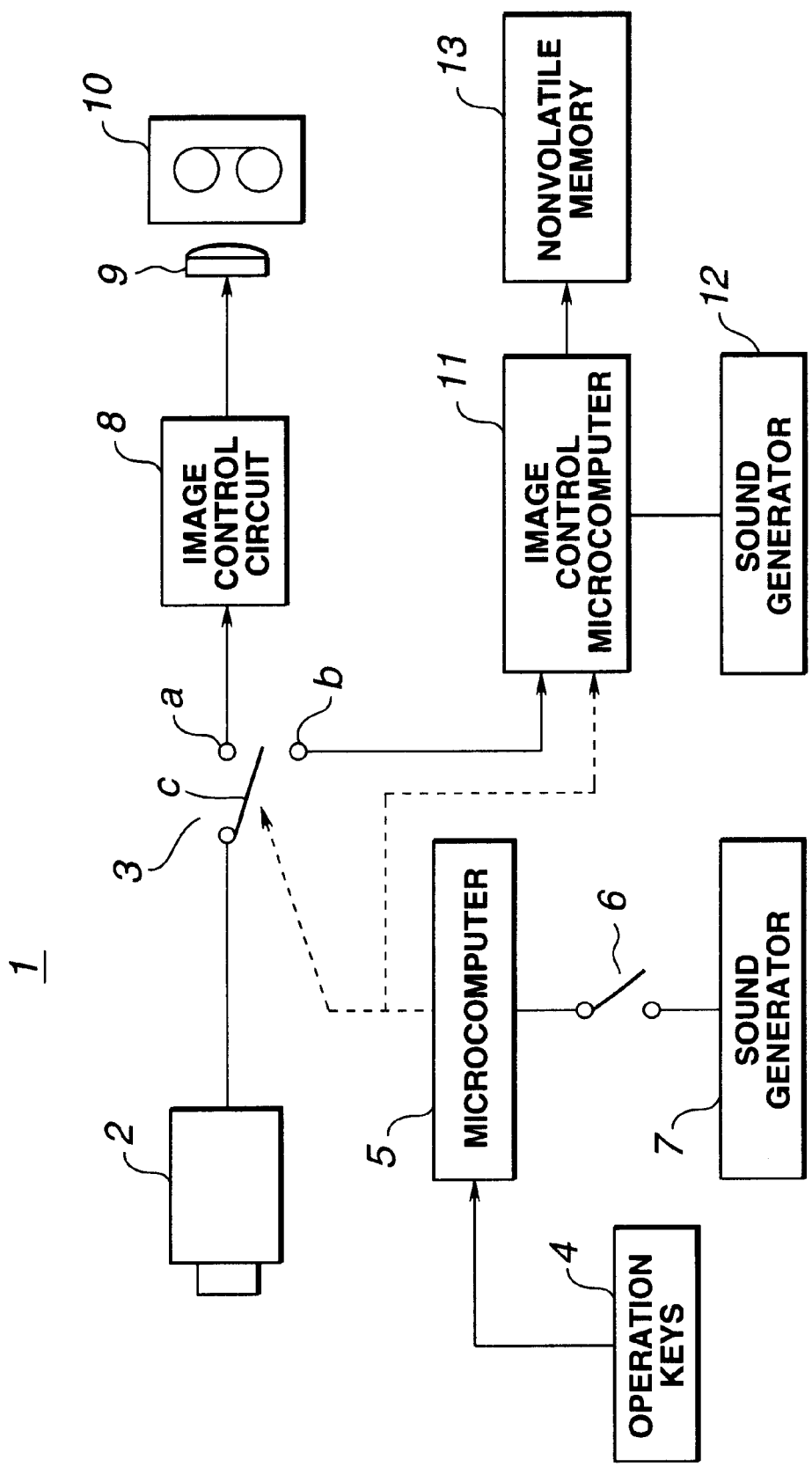
FIG. 1 is a schematic block diagram of a video camera/recorder according to the present invention.

Referring now to FIG. 1, there is illustrated a signal recording apparatus according to the present invention. More specifically, it is a video camera/recorder, generally indicated with a reference numeral 1. The video camera/recorder 1 is provided with a portable memory card, and incorporates a video tape 10 and a nonvolatile memory 13 as recording media. The video camera/recorder 1 is adapted to record a moving picture and still picture into the video tape 10 while recording a still picture into the nonvolatile memory 13.

When the user selects a mode of still picture recording, the video camera/recorder 1 will generate one trigger sound for recording into the video tape 10 and another trigger sound destined for recording into the nonvolatile memory 13 and which is definitely different from the sound for recording into the video tape 10.

As seen from FIG. 1, the video camera/recorder 1 comprises a camera 2, operation keys 4, and a microcomputer 5 which controls a select switch 3 to select recording into either the video tape 10 or into the nonvolatile memory 13 according to a selection made by the user operating the operation keys 4.

Further, the video camera/recorder 1 comprises an image control circuit 8 which provides an image processing to be effected appropriately when the microcomputer 5 places the select switch 3 at a position for recording a still picture into the video tape 10, and a magnetic head 9 to record an image signal from the image control circuit 8 into the video tape 10.

Also, the video camera/recorder 1 comprises an image control microcomputer 11 which provides an image processing to be effected appropriately when the microcomputer 5 places the select switch 3 at a position for recording a still picture into the nonvolatile memory 13.

The microcomputer 5 is connected thereto via a switch 6 a sound generator 7 which generates a pulse sound like "crackling" as a trigger sound when a still picture is recorded into the video tape 10. The sound generator 7 generates the sound in the PWM (pulse width modulation) mode.

The image control microcomputer 11 is connected thereto a sound generator 12 which generates a shutter sound like "clicking" as a trigger sound when a still picture is recorded into the nonvolatile memory 13.

The sound generator 12 is in the sleep mode when the microcomputer 5 is detecting a recording into the video tape 10, namely, when the sound generator 12 is not in use. Therefore, the sound generator 12 will consume no extra power.

The video camera/recorder 1 functions as will be described below:

In the video camera/recorder 1, the microcomputer 5 detects a function selected by the user operating the keys 4, and selects any one of the recording media to which an input picture is to be recorded. When the video tape 10 is selected as a destination of this recording, a contact c of the switch 3 is connected to a terminal a and thus an picture picked up by a camera 2 is passed through the image control circuit 8 and recorded into the video tape 10 via the magnetic head 9. At this time, the microcomputer 5 will turn on a switch 6 so that the sound generator 7 will generate a "crackling" alarm sound upon pressing, by the user, of a photo key included in the operation keys 4.

When the user selects one of the operation keys 4 for recording into the nonvolatile memory 13, the switch contact c of the switch 3 is connected to a terminal b and thus an picture picked up by the camera 2 is passed through the image control microcomputer 11 and recorded into the nonvolatile memory 13. At this time, the microcomputer 5 will turn off the switch 6 and the sound generator 12 connected to the image control microcomputer 11 will generate a "clicking" sound upon pressing, by the user, of the photo key included in the operation keys 4.

The video tape 10 can record a moving picture in addition to a still picture, but the nonvolatile memory 13 can record only a still picture. Since the video camera/recorder 1 operates similarly to a conventional still camera, so the operation alarm sound should desirably be similar to the operating sound of still camera.

In case one video camera/recorder 1 has similar functions as mentioned above, it is provided with the two sound generators 7 and 12 one of which is put into operation by the microcomputer 5 detecting which one of the functions has been selected, thereby providing an alarm sound for the selected function, which is discernible from a one for another selected function.

If it is allowed from the econoimcal aspect to use a microcomputer 5 having a relatively high capability of processing, the sound generator 12 may be connected to the image control microcomputer 11. Further, only the sound generator 7 may be used to generate two alarm sounds without using the sound generator 12.

When an apparatus having a single function is already available and a new apparatus which incorporates the existing apparatus is designed, a sound source which generates a sound similar to the alarm sound issued for the single function may be provided to allow the user to clearly understand the function incorporated in the new apparatus.

Figure 2:
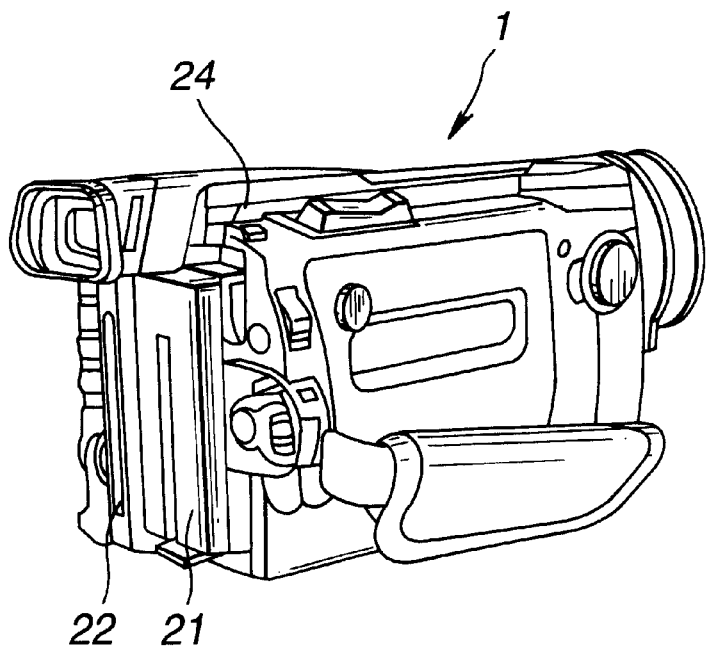
FIG. 2 is a perspective view of the video camera/recorder using a PC card as a second recording medium.

FIG. 2 shows a video camera/recorder I using a PC card as the second recording medium in place of the nonvolatile memory 13.

Figure 3:
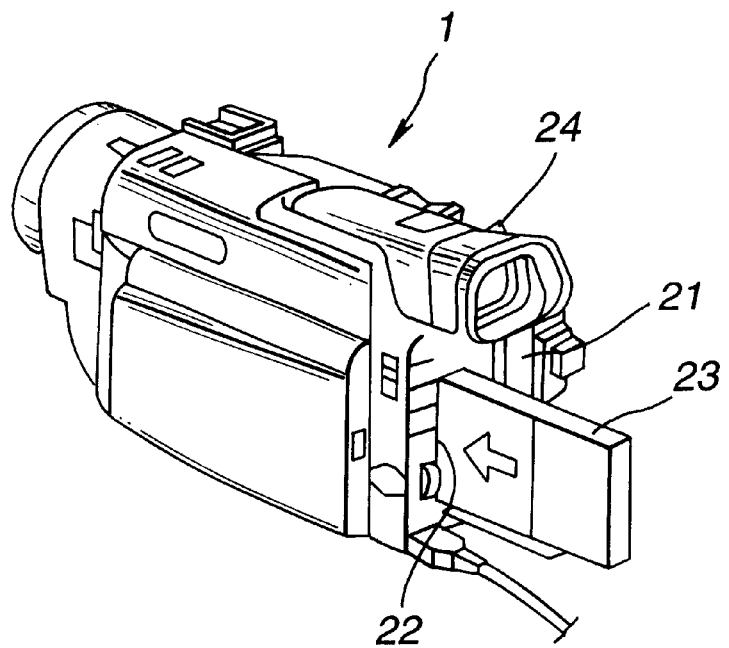
FIG. 3 is a perspective view of the video camera/recorder shown in FIG. 2, showing the PC card being inserted into the video camera/recorder.

The video camera/recorder 1 operates on a battery 21. The PC card 23 is inserted into the vide camera/recorder 1 through a card slot 22 as shown in FIG. 3. The PC card 23 can record a still picture picked up by the video camera/recorder 1 as in the above, and an picture already existent on the video tape 10 also set in the video camera/recorder 1. The video tape 10 can also record a still picture and also a moving picture.

When the user selects to record a still picture into the PC card 23 and presses a photo button 24, a "clicking" sound is generated from the sound generator 12 at the same time. Also, when the user selects to record a still picture into the video tape 10 and presses the photo button 24, a "crackling" sound is generated from the sound generator 7 at the same time.

Thus, the user can be informed, by such different sounds, of which one of the functions is performed.

As having been described in the foregoing, the present invention permits to inform the user of which one of similar functions incorporated in one apparatus is performed.

What is claimed is:

1. A camera apparatus for recording video signals representative of still pictures and moving pictures, said apparatus comprising:
    a first recording medium adapted to record video signals representative of a still picture and a moving picture;
    a second recording medium adapted to record a video signal representative of a still picture;
    selecting means for allowing a user to select one of said first recording medium and said second recording medium for recording said video signals thereto;
    sound generating means for providing a first sound and a second sound which is different from said first sound; and
    controlling means for causing said first sound to be provided when a signal representative of a still picture is recorded into the first recording medium and causing said second sound to be provided when a signal representative of a still picture is recorded into the second medium.

2. The apparatus as set forth in claim 1, wherein the first recording medium is a magnetic tape.

3. The apparatus as set forth in claim 1, wherein the second recording medium is a semiconductor memory.

4. The apparatus as set forth in claim 1, wherein the second recording medium is a memory card.

5. The apparatus as set forth in claim 1, wherein the sound generating means includes first and second sources for respectively providing the first and second sounds.

6. The apparatus as set forth in claim 5, wherein the respective source of a sound when a still picture is recorded into the second recording medium consumes less power when it is unused than usual.

7. A method of recording video signals representative of still pictures and moving pictures using a camera, the method comprising the steps of:
    enabling a user to select one of a first recording medium and a second recording medium for recording said video signals thereto, said first recording medium being adapted to record video signals representative of a still picture and a moving picture, and said second recording medium being adapted to record a video signal representative of a still picture;
    providing a first sound when a signal representative of a still picture is recorded into the first recording medium; and
    providing a second sound different from the first sound when a signal representative of a still picture is recorded into the second recording medium,
    whereby the first and second sounds are provided by a sound providing device.

* * * * *